United States Patent
Lee et al.

(10) Patent No.: US 11,148,097 B2
(45) Date of Patent: Oct. 19, 2021

(54) LOW-TEMPERATURE MEMBRANE SEPARATION DEVICE AND METHOD FOR CAPTURING CARBON DIOXIDE AT HIGH CONCENTRATION

(71) Applicant: KOREA INSTITUTE OF ENERGY RESEARCH, Daejeon (KR)

(72) Inventors: Jung Hyun Lee, Daejeon (KR); Jeong-gu Yeo, Daejeon (KR); Jong-ho Moon, Daejeon (KR); Woong Jin Oh, Daejeon (KR); Dahun Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 133 days.

(21) Appl. No.: 16/558,315

(22) Filed: Sep. 3, 2019

(65) Prior Publication Data
US 2021/0060480 A1    Mar. 4, 2021

(51) Int. Cl.
*B01D 53/22* (2006.01)
(52) U.S. Cl.
CPC ...... *B01D 53/226* (2013.01); *B01D 2311/106* (2013.01)
(58) Field of Classification Search
None
See application file for complete search history.

(56) References Cited

U.S. PATENT DOCUMENTS

| | | | |
|---|---|---|---|
| 7,964,020 B2 | 6/2011 | Baker et al. | |
| 8,663,364 B2 | 3/2014 | Hasse et al. | |
| 9,452,385 B1 | 9/2016 | Kulkarni | |
| 9,452,386 B1 | 9/2016 | Kulkarni | |
| 2011/0009684 A1* | 1/2011 | Diaz | B01D 53/225 585/818 |
| 2012/0111051 A1* | 5/2012 | Kulkarni | B01D 53/226 62/619 |

(Continued)

FOREIGN PATENT DOCUMENTS

| | | |
|---|---|---|
| KR | 1020110001188 A | 1/2011 |
| KR | 101542453 B1 | 8/2015 |

(Continued)

OTHER PUBLICATIONS

Korean Office Action for KR Application No. 10-2020-0012555 dated Mar. 3, 2020, citing the above reference(s).

*Primary Examiner* — Jason M Greene
(74) *Attorney, Agent, or Firm* — Cantor Colburn LLP (57) ABSTRACT

The present invention relates to a low-temperature membrane separation device and method for capturing carbon dioxide at a high concentration, in which a gas mixture is passed through a membrane unit to thus separate carbon dioxide. The membrane unit includes a membrane for capturing carbon dioxide and is connected to a feed gas line, a retentate gas line and a permeate gas line. The method includes a first separation step of passing the gas mixture through a first membrane unit and a second separation step of passing the permeation gas, which is discharged to the permeate gas line connected to the first membrane unit, through a second membrane unit. The second separation step is performed at a temperature that is lower than a temperature at which the first separation step is performed.

9 Claims, 8 Drawing Sheets

(56) References Cited

U.S. PATENT DOCUMENTS

| | | | | |
|---|---|---|---|---|
| 2015/0273388 | A1* | 10/2015 | Fukuda | B01D 53/226 |
| | | | | 95/45 |
| 2018/0140994 | A1* | 5/2018 | Yeo | B01D 53/226 |
| 2018/0207577 | A1* | 7/2018 | Gu | B01D 53/226 |
| 2020/0254383 | A1* | 8/2020 | Roodbeen | B01D 53/226 |

FOREIGN PATENT DOCUMENTS

| | | | |
|---|---|---|---|
| KR | 1020170046828 | A | 5/2017 |
| KR | 101763144 | B1 | 8/2017 |

* cited by examiner

LOW-TEMPERATURE MEMBRANE SEPARATION DEVICE AND METHOD FOR CAPTURING CARBON DIOXIDE AT HIGH CONCENTRATION

BACKGROUND OF THE INVENTION

1. Field of the Invention

The present invention relates to a technology for separating carbon dioxide from a gas mixture, and more particularly to a membrane separation technology for capturing carbon dioxide at a high concentration.

2. Description of the Related Art

Recently, as ecosystem and environmental problems such as global warming due to greenhouse gases and climate change become serious, a lot of researches on technology for capturing $CO_2$ has been conducted with the goal of reducing the emission of greenhouse gases, primarily carbon dioxide. A membrane separation technology has the advantage of being an eco-friendly process. However, membrane materials and modules have mainly been developed, and studies on post-combustion capture processes have been conducted only by some companies.

U.S. Pat. No. 7,964,020 discloses a method of separating gases using a membrane having a permeate sweep in order to remove carbon dioxide from combustion gases. U.S. Pat. No. 7,964,020 includes a construction in which a discharge gas to be treated is fed into an feed of a membrane and a sweep gas such as air is provided into a permeation unit to transfer a permeation gas and a sweep gas to a combustor. As a result, the permeation gas of the membrane is recovered to a boiler together with the sweep gas, thereby increasing the composition of carbon dioxide in a feed side of the membrane. However, the constitution disclosed in U.S. Pat. No. 7,964,020 has a limitation in application to an actual process because it may change the boiler efficiency when the actual process is applied to a power plant.

Further, U.S. Pat. Nos. 8,663,364, 9,452,385, and 9,452,386 disclose technologies for separating carbon dioxide by combining a membrane separation and a low-temperature process. Specifically, U.S. Pat. No. 8,663,364 discloses a technology for cooling gas mixture containing carbon dioxide and performing separation into a carbon-dioxide-rich stream and a carbon-dioxide-lean stream through a membrane. In the literature, the carbon-dioxide-rich stream is partially condensed after compression, followed by cryogenic phase separation, thus generating a carbon-dioxide-rich liquid that is finally liquefied and a carbon-dioxide-lean gas stream ($CO_2$ lean vapor stream). The carbon-dioxide-lean gas stream is combined with the mixed gas, thus reducing the concentration of carbon dioxide of the target.

Further, U.S. Pat. Nos. 9,452,385 and 9,452,386 disclose a technology for passing an exhaust gas through a membrane to form a carbon-dioxide-rich permeation stream and a carbon-dioxide-lean non-permeation stream. In these literatures, the permeation stream is cooled to be partially condensed, from which a high-purity carbon dioxide liquid is separated. A regeneration product stream is generated from the carbon-dioxide-lean non-permeation stream in the PSA unit and then recycled, followed by combustion in a combustor for generating the exhaust gas.

However, even though a low-temperature process is used to increase the purity of the separated carbon dioxide, the purity of carbon dioxide after passing through the membrane is limited to about 68%. Also, it requires substantial cooling energy for cooling the mixed gas.

SUMMARY OF THE INVENTION

Accordingly, the present invention has been made keeping in mind the above problems occurring in the related art, and an object of the present invention is to provide a membrane separation device and method for capturing carbon dioxide with improved efficiency using a membrane.

Specifically, an object of the present invention is to provide a membrane separation device and method for reducing cooling energy and capturing high-purity carbon dioxide at a high recovery rate when a low-temperature membrane process is applied in order to capture high-purity carbon dioxide.

In order to accomplish the above object, the present invention provides a low-temperature membrane separation device for capturing carbon dioxide at a high concentration. The low-temperature membrane separation device is a membrane separation device used in a carbon-dioxide-separation system for separating carbon dioxide from gas mixture. The membrane separation device includes a first membrane unit and a second membrane unit. The first membrane unit includes a membrane for separating carbon dioxide, and is connected at a feed side thereof to a first feed gas line, into which a gas is provided, at a retentate side thereof to a first retentate gas line, to which a residual gas is discharged, and at a permeate side thereof to a first permeate gas line, to which a permeation gas is discharged. The second membrane unit includes a membrane for capturing carbon dioxide and is connected at a feed side thereof to a second feed gas line connected to the first permeate gas line, at a retentate side thereof to a second retentate gas line, to which a residual gas is discharged, and at a permeate side thereof to a second permeate gas line, to which a permeation gas is discharged. In the first membrane unit, a first separation step of passing the mixed gas, which is provided through the first feed gas line, through the first membrane unit is performed. In the second membrane unit, a second separation step of providing the permeation gas, which is released through the first permeate gas line of the first membrane unit, through the second feed gas line into the second membrane unit, followed by passing the provided gas through the second membrane unit, is performed. The membrane separation device according to the present invention may be controlled so that the second separation step is performed at a temperature that is lower than the temperature at which the first separation step is performed.

Unless otherwise specified in the present specification, the expression "temperature at which the first separation step is performed" is used to refer to the temperature of the first membrane unit, and the expression "temperature at which the second separation step is performed" is used to refer to the temperature of the second membrane unit. Further, the temperatures at which the first and second separation steps are performed may be adjusted by adjusting the temperatures of the first and second membrane units or/and the temperatures of the mixed gases provided into the first and second membrane units.

Specifically, the temperature of the gas provided through the second feed gas line into the second membrane unit may be adjusted so as to be lower than the temperature of the gas provided through the first feed gas line into the first membrane unit. To this end, a feed-gas-cooling device may be provided on each of the first feed gas line and the second feed gas line, and the cooling temperature of each cooling device may be adjusted so that the temperature of the gas flowing through the second feed gas line is lower than the temperature of the gas flowing through the first feed gas line. Alternatively, the feed-gas-cooling device may be provided only on the second feed gas line, and only the gas flowing through the second feed gas line may be cooled, so that the temperature of the gas provided into the second membrane unit is adjusted to be lower than the temperature of the gas provided into the first membrane unit. Further, the feed-gas-cooling device may include a gas-cooling means for cooling the gas and a low-temperature-maintaining means for maintaining the gas-cooling means at a low temperature.

Preferably, the temperature of the second membrane unit may be adjusted so as to be lower than the temperature of the first membrane unit. Instead of the above-described method of adjusting the temperatures of the gases provided into the first and second membrane units, a membrane-cooling device may be provided in each of the first membrane unit and the second membrane unit in order to adjust the temperatures of the first and second membrane units. Alternatively, the membrane-cooling device may be provided only in the second membrane unit, and only the second membrane may be cooled, so that the temperature of the second membrane is adjusted to be lower than the temperature of the first membrane. Meanwhile, the membrane-cooling device may include a chamber surrounding the outside of the membrane unit and a cooling unit for reducing the temperature inside the chamber.

The feed-gas-cooling device and the membrane-cooling device are suggested as examples of constitutions provided so that the second separation step performed in the second membrane unit is performed at a temperature lower than the temperature at which the first separation step is performed in the first membrane unit. Accordingly, as long as the second separation step is performed at a temperature lower than the temperature at which the first separation step is performed, a combination of the above-described cooling devices and various other known constitutions may be employed without limitation in the device of the present invention.

Further, in order to accomplish the above object, in a low-temperature membrane separation method for capturing carbon dioxide at a high concentration according to the present invention, gas mixture is passed through a membrane unit to thus separate carbon dioxide. The membrane unit includes a membrane for capturing carbon dioxide and is connected at a feed side thereof to a feed gas line, into which a gas is provided, at a retentate side thereof to a retentate gas line, to which a residual gas is discharged, and at a permeate side thereof to a permeate gas line, to which a permeation gas is discharged. The membrane separation method includes a first separation step of passing the mixed gas through a first membrane unit and a second separation step of passing the permeation gas, which is discharged to the permeate gas line connected to the first membrane unit, through a second membrane unit. The second separation step is performed at a temperature that is lower than the temperature at which the first separation step is performed.

In particular, the carbon dioxide selectivity in the second membrane unit is constituted so as to be higher than the carbon dioxide selectivity in the first membrane unit. It may include that, as the temperature of the separation process is reduced, a permeance difference between carbon dioxide and the others such as nitrogen passing through the membrane is increased, resulting in rising of the carbon dioxide selectivity in the second separation step, which is a separation process performed at a relatively low temperature. In addition, a method of adjusting various operating parameters and selecting the material of the membrane so as to increase the carbon dioxide selectivity in the second membrane unit may be considered.

The temperature at which the first separation step is performed may be adjusted by adjusting the temperature of the first membrane unit or/and the temperature of the mixed gas provided into the first membrane unit. Further, the temperature at which the second separation step is performed may be adjusted by adjusting the temperature of the second membrane unit or/and the temperature of the gas that permeates the first membrane unit and is then provided into the second membrane unit.

Specifically, the second separation step may be performed at a temperature in the range of −40° C. to 0° C., preferably −40° C. or more and less than −10° C., and more preferably −40° C. to −20° C. Further, the first separation step may be performed at a temperature in the range of −20° C. to 30° C., and preferably 0° C. to 30° C.

In the method according to the present invention, the activation energy for $CO_2$ permeation may be constituted so as to be smaller than the activation energy for $N_2$ permeation in the membrane of the second membrane unit. Preferably, the membrane of the second separation step may include any material in which the difference between the permeance of $CO_2$ and the permeance of $N_2$ is increased as the temperature is decreased.

The low-temperature membrane separation device and method for capturing carbon dioxide at a high concentration according to the present invention may be applied to various systems for capturing carbon dioxide using a membrane separation process in order to separate carbon dioxide from gas mixture.

According to the above-described constitution of the present invention, it is possible to capture high-purity carbon dioxide at a high recovery rate by performing a second separation step at a temperature that is lower than the temperature at which a first separation step is performed.

Further, a stepwise low-temperature process in which a second separation step is performed at a temperature that is lower than the temperature at which a first separation step is performed may be adopted, whereby it is possible to significantly reduce the cooling energy required in a low-temperature process in order to recover high-purity carbon dioxide and it is also possible to recover carbon dioxide having relatively further increased purity.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Examples according to the present invention will be described in detail with reference to the accompanying drawings.

Figure 1:
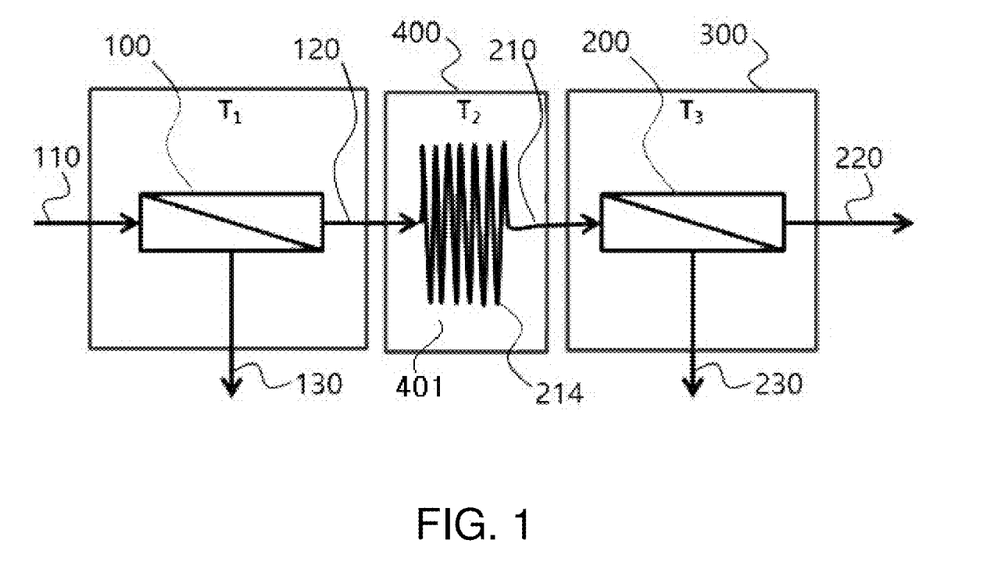
FIG. 1 is a schematic view of a low-temperature membrane separation device for capturing carbon dioxide at a high concentration according to an embodiment of the present invention.

FIG. 1 shows the structure of a low-temperature membrane separation device for capturing carbon dioxide at a high concentration according to an embodiment of the present invention.

The membrane device of the present embodiment includes a first membrane unit 100 and a second membrane unit 200 including a membrane for capturing carbon dioxide, and further includes a cooling means for performing a second separation step at a temperature that is lower than the temperature at which the first separation step is performed.

The cooling means is a means for reducing the temperature at which the second separation step is performed. The cooling means may be embodied in the form of a membrane-cooling device 300 provided in the second membrane unit to cool at least the membrane of the second membrane unit 200, or/and in the form of an feed-gas-cooling device 400 for cooling at least the feed gas provided into the second membrane unit 200. Together with the cooling devices for reducing the temperature at which the second separation step is performed, the membrane-cooling device may be provided in the first membrane unit 100 or/and a cooling device for the feed gas provided into the first membrane unit 100 may be provided in order to adjust the temperature at which the first separation step is performed.

The membrane unit includes one or more membranes in a housing. When the mixed gas is provided into the housing, the gases that are capable of passing through the membrane permeate the membrane and are then discharged as permeation gas to the outside of the housing. The gases that do not pass through the membrane are discharged as residual gas to the outside of the housing. The membrane unit may be expressed as a membrane module. The residual gas does not include only the gases that do not pass through the membrane, but also some of the gases that are capable of passing through the membrane may be discharged as the residual gas.

A first feed gas line 110, a first permeate gas line 120, and a first retentate gas line 130 are connected to the first membrane unit 100. A second feed gas line 210, a second permeate gas line 220, and a second retentate gas line 230 are connected to the second membrane unit 200.

The feed gas lines 110 and 210 are lines through which a target gas to be separated is supplied to the inside of the housings of the membrane units 100 and 200. In the device of the present embodiment, the separation by the second membrane unit 200 is performed continuously after the separation by the first membrane unit 100. Accordingly, the first permeate gas line 120 of the first membrane unit 100 becomes the second feed gas line 210 of the second membrane unit 200. Examples of the mixed gas supplied to the first membrane unit 100 may include all types of gas containing $CO_2$, such as combustion exhaust gas from a power plant, exhaust gas from a cement process, and other industrial byproduct gases.

The permeate gas lines 120 and 220 are lines to which the permeation gas that passes through the membrane, among the mixed gases supplied to the membrane units 100 and 200, is discharged. Since the purpose of the present embodiment is to separate carbon dioxide, the permeation gas discharged to the permeate gas lines 120 and 220 contains a lot of carbon dioxide. An increase in purity, which is the ratio of carbon dioxide contained in the permeation gas, indicates high mixed gas selectivity of the membrane. In other words, if selective permeation is accomplished actively through the membrane, the purity measurement is high. The retentate gas lines 130 and 230 are lines to which the residual gas that does not pass through the membrane among the mixed gases supplied to the membrane units 100 and 200 is discharged. The residual gas may contain some carbon dioxide. The total amount of carbon dioxide contained in the mixed gas supplied to the membrane units 100 and 200 is equal to the sum of the amount of carbon dioxide contained in the permeation gas and the amount of carbon dioxide contained in the residual gas. The amount of carbon dioxide contained in the permeation gas to the total amount of carbon dioxide contained in the mixed gas is expressed as a recovery rate.

Among the membranes provided in the membrane units 100 and 200, at least the membrane of the second membrane unit 200 may be a polymer membrane, a microporous membrane, or a zeolite membrane that carbon dioxide selectively permeates. In the polymer membrane and the microporous membrane such as carbon-based membranes, the diffusivity deteriorates as the temperature decreases according to the Arrhenius equation. In the zeolite membrane, the surface adsorption of $CO_2$ in the pores of the membrane is increased as the temperature is decreased. The polymer membrane may include all types of polymer materials used to manufacture a typical membrane. For example, a polymer material containing imide, sulfone, ether, or amine in the functional groups constituting a main chain or a branched body of the polymer is feasible. By applying such a material, it is possible to capture carbon dioxide at a high concentration through the low-temperature membrane process for cooling the second membrane unit 200.

Further, the membranes provided in the membrane units 100 and 200 may include a material in which the activation energy of permeation for $CO_2$ is smaller than the activation energy of permeation for $N_2$.

The permeance P of the gas depending on the temperature change in the gas membrane generally follows the Arrhenius equation given below.

$$P = P_0 e^{\frac{-E_p}{RT}}$$

($P_o$ is the permeance in a standard state, R is the gas constant, $E_p$ is the activation energy of permeation, and T is the absolute temperature)

The activation energy of permeation Ep depends on the kind of gas, even for the same polymer material. Examples of the membrane material suitable for use in the present invention may include a membrane material in which $E_p$ for carbon dioxide is smaller than $E_p$ for nitrogen within the temperature range in which the separation process is performed. In addition, when the difference between the permeance of $CO_2$ and the permeance of $N_2$ is increased as the temperature is decreased, the effect of improving the carbon dioxide selectivity according to the reduction of the process temperature may be further increased.

Figure 2A:
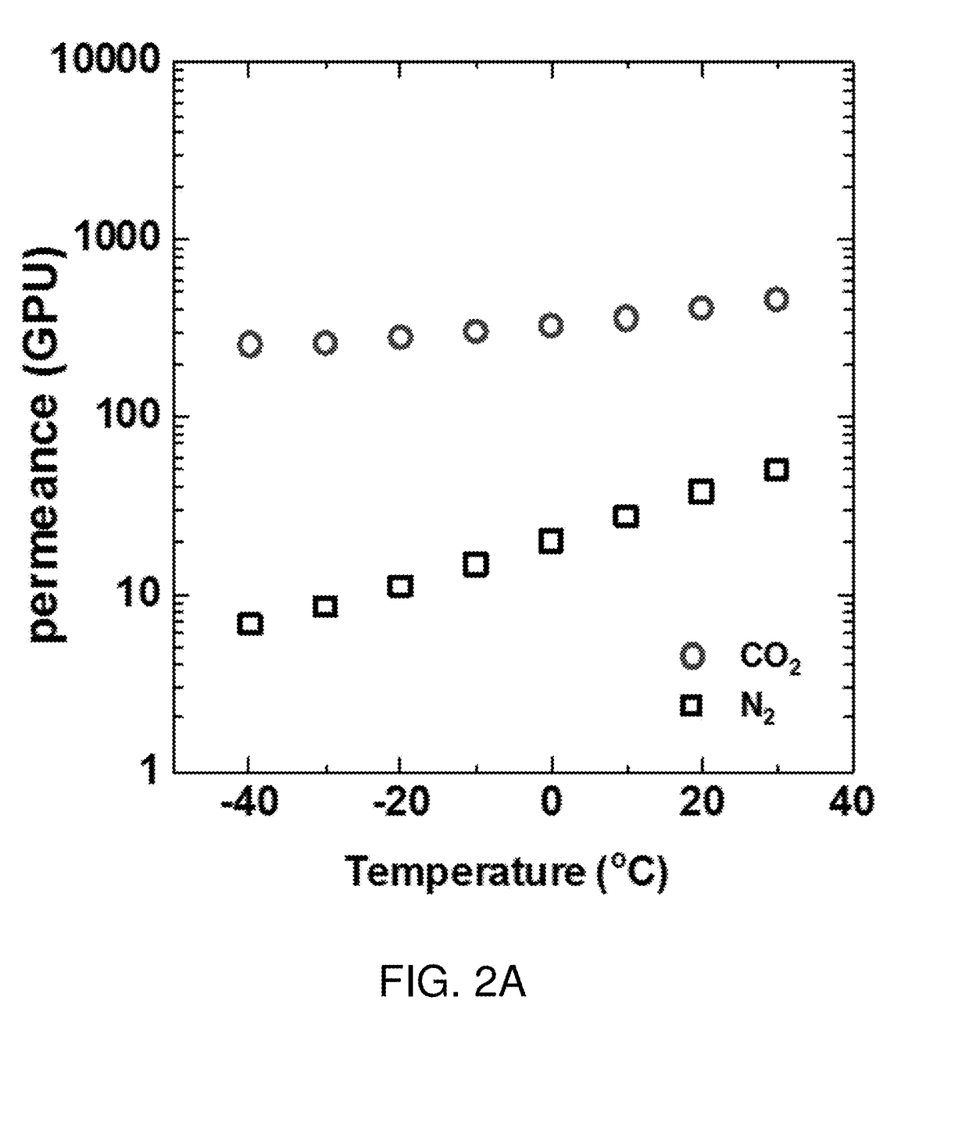
FIGS. 2A and 2B are graphs showing the permeance of carbon dioxide and nitrogen, respectively, depending on the temperature of a membrane unit, for each material of the exemplary membrane.
Figure 2B:
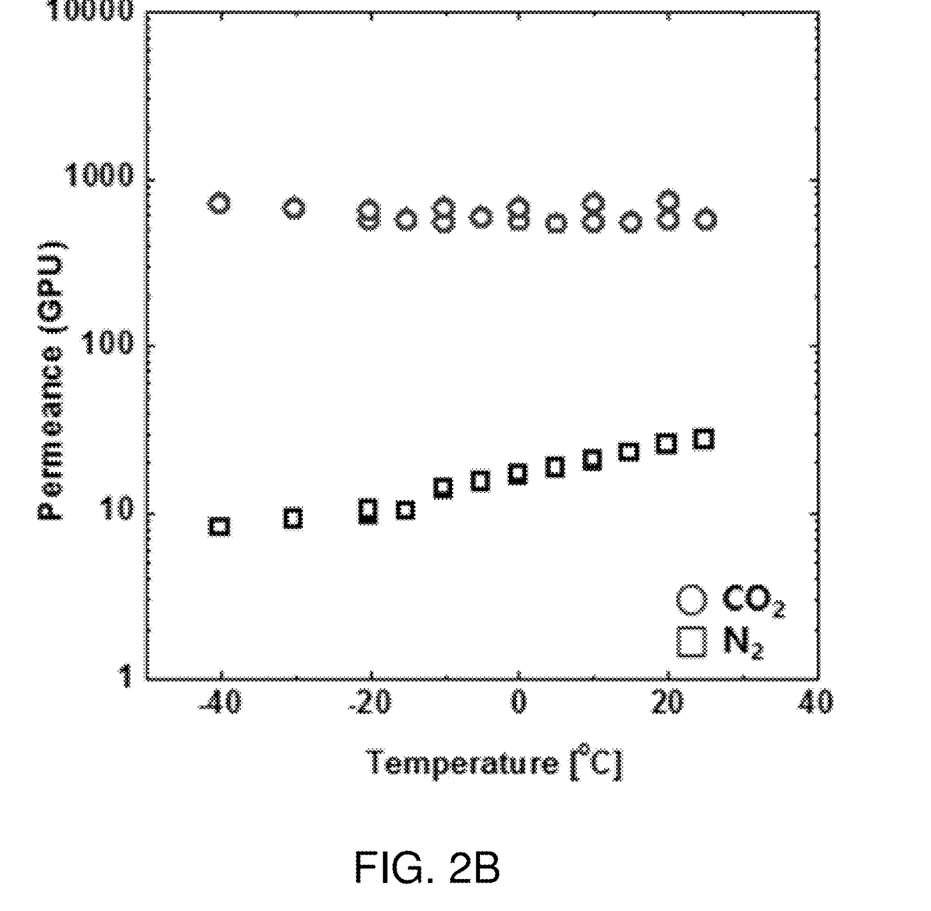

FIG. 2 shows a polymer material in which the activation energy of permeation for $N_2$ is larger than the activation energy of permeation for $CO_2$. FIG. 2A is a graph showing the result of measurement of the permeance of a single gas of carbon dioxide and a single gas of nitrogen respectively, depending on the temperature of the membrane, in a polysulfone-based membrane. FIG. 2B is a graph showing the result of measurement of the permeance of a single gas of carbon dioxide and a single gas of nitrogen respectively, depending on the temperature of the membrane, in a polyimide-based membrane. As shown in the drawings, the permeance of $CO_2$ is higher than the permeance of $N_2$ in the above-described temperature range in both materials of FIGS. 2A and 2B. Accordingly, both materials may be used as the material of the membrane units 100 and 200 of the present invention. Further, when the temperature is decreased, the permeance of $CO_2$ to the membrane is increased and the permeance of $N_2$ to the membrane is decreased, so that the carbon dioxide selectivity for the mixed gas is relatively increased. Therefore, it will be understood that the use of the low-temperature membrane separation process is useful for obtaining high-quality carbon dioxide.

The first feed gas line 110 of the first membrane unit 100 and the second feed gas line 210 of the second membrane unit 200 may include a pressure device, and the first permeate gas line 120 and the second permeate gas line 220 may include a decompression device. The pressure at the feed gas lines may be in the range of atmospheric pressure or more and 5 bar or less, and the pressure discharged to the permeate gas line may be in the range of 0.05 bar or more and 0.5 bar or less.

The membrane-cooling device 300 is a device for reducing the temperature of the second membrane unit 200 to the range of −40° C. to 0° C. in order to increase the efficiency of recovery of carbon dioxide. The temperature of the membrane unit is capable of being measured while a temperature sensor adjusted to a set temperature in the chamber of the membrane-cooling device 300 is not in contact with the surface of the membrane unit. In the present specification, the term 'membrane unit' is used as a term including a membrane module having one or more membranes in the housing and the like. The temperature of the membrane unit measured using the temperature sensor does not mean the temperature of the membrane itself provided therein, but may be considered to reflect the temperatures of both the internal space of the membrane unit and the membrane.

The membrane-cooling device of the present invention may be provided for the purpose of cooling the membrane unit so that the internal space of the housing of the membrane unit and the membrane are cooled, and may be constituted to include a chamber surrounding the outside of the membrane unit and a cooling unit for cooling the inside of the chamber to thus cool the membrane unit. In the embodiment of FIG. 1, the membrane-cooling device 300 is provided only for the second membrane unit 200. However, the membrane-cooling device may be selectively provided for the first membrane unit 100. Further, as long as the membrane-cooling device is constituted so as to be capable of reducing the temperature of the membrane, the membrane-cooling device is not limited only to the structure for cooling the membrane unit in the chamber, and various constitutions may be applied thereto.

Figure 3:
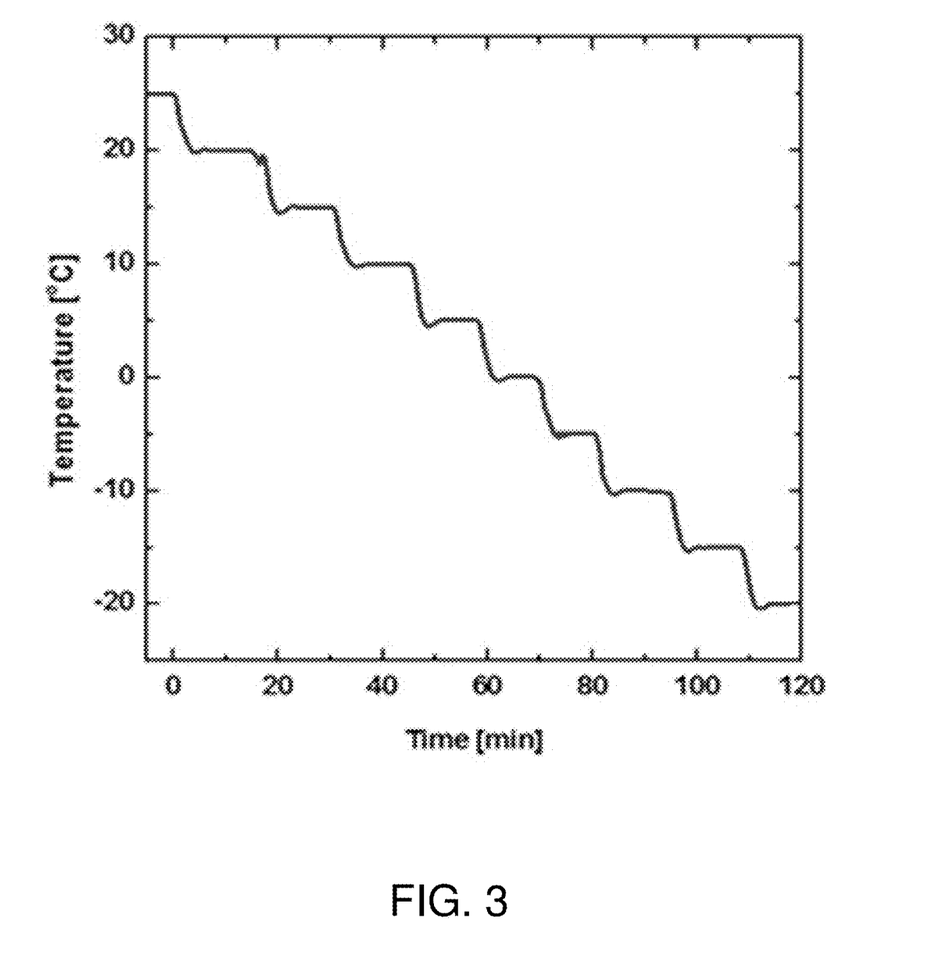
FIG. 3 is a view showing an example of cooling of the membrane unit in the embodiment of the present invention.

FIG. 3 is a view showing an example of cooling of a membrane unit using a membrane-cooling device in a low-temperature membrane separation device for capturing carbon dioxide at a high concentration according to an embodiment of the present invention.

When a set value is reduced from an initial temperature of 25° C. by 5° C. so that the temperature is set to 20° C., the internal temperature of the chamber, that is, the temperature of the membrane unit, is reduced to 20° C. within a few minutes, for example, within 4 minutes. It is checked whether the temperature is in a constant state for a time that is longer than a temperature change time, for example, for 6 minutes or more, and the temperature is then set to be reduced by 5° C., which enables the temperature to be reduced to 15° C. within a few minutes. This process is repeated several times to reduce the temperature to −20° C. and finally maintained at a temperature of −20° C. This indicates that the temperature change of the membrane-cooling device is favorable. The cooling rate depends on the specification of the cooling device.

As shown in the drawing, the temperature of the membrane unit may be reduced through the membrane-cooling device, but a considerable time is required for cooling. In this regard, a separation process may be performed while each membrane-cooling device is operated in advance so that the temperatures of the membrane units 100 and 200 are adjusted to a desired temperature before starting the separation of carbon dioxide in each of the membrane units 100 and 200. Accordingly, it is not necessary to apply a high-performance rapid cooling device even when cooling is performed to a relatively low temperature because there is a relatively greater time margin compared to the case of cooling the moving gas.

When the membrane-cooling device for cooling the membrane unit through the chamber is applied as described above, a part of the feed gas line, the permeate gas line, and the retentate gas line may be located inside the chamber. However, since the mixed gas, the permeation gas, and the residual gas continuously flow, the above-described structure does not greatly change the temperatures thereof, and a separate gas-cooling means and structure may be provided as required, as will be described later.

Referring again to FIG. 1, the feed-gas-cooling device 400 is constituted to cool the gas flowing through the second feed gas line 210 of the second membrane unit 200. The embodiment of FIG. 1 shows a constitution that includes a coil unit 214, which is extended to the second feed gas line 210, and a low-temperature maintenance unit 401 for cooling the coil unit 214 and the periphery thereof to thus maintain a low temperature so that the gas flowing through the coil unit is cooled. The means for cooling the gas may include not only the constitution of the coil unit and the low-temperature maintenance unit but also any means for reducing the temperature of the gas, such as a buffer tank and a plate heat exchanger.

It is generally necessary to apply an expensive rapid-cooling device because the gas flowing through the feed gas line continues to move. However, in the present embodiment, the coil unit 214 is formed so that the path in which the gas is cooled by the low-temperature maintenance unit 401 is sufficiently long. Accordingly, the gas may be sufficiently cooled without using a rapid-cooling device. For this purpose, the length of the coil unit may be adjusted within a range of, for example, 14 m or less to apply the coil unit.

The feed-gas-cooling device may cool the feed gas provided into the second membrane unit 200 to the range of −40° C. to 0° C. As described above, in the present invention, in order to perform the second separation step at a temperature that is lower than the temperature at which the first separation step is performed, a method of adjusting the temperatures of the first membrane unit and the second membrane unit may be used. Additionally or alternatively, a method of adjusting the temperature of the gas provided into the first membrane unit and the temperature of the gas provided into the second membrane unit may be used. Further, the feed-gas-cooling device 400 for cooling the feed gas of the second membrane unit 200 is provided in the embodiment of FIG. 1 in order to adjust the temperature of the feed gas. However, a feed-gas-cooling device for cooling the feed gas of the first membrane unit 100 may optionally be provided.

In the low-temperature membrane separation method for capturing carbon dioxide at a high concentration according to the present invention, when membrane separation processes using the two membrane units, including the first separation step using the first membrane unit and the second separation step using the second membrane unit, are continuously applied, the second separation step is performed at a temperature that is lower than the temperature at which the first separation step is performed.

The present inventors adopted a stepwise cooling method in a continuous two-stage membrane separation process, thereby finding a method of maintaining both high separation efficiency and a high recovery rate while reducing cooling energy. It was found that in the two-stage membrane separation process, the recovery rate of the first membrane is directly related to the recovery rate of the whole process and that the separation efficiency (selectivity) of the second membrane is directly related to the purity of the whole process. Therefore, the present inventors noted that it is necessary to realize a high recovery rate in the first membrane process and to realize a high separation efficiency (selectivity) in the second membrane process in order to maintain both a high recovery rate and high purity in the overall operation of the two-stage membrane separation process. Accordingly, the present inventors devised a membrane separation method for maintaining both the high recovery rate and the high purity of the whole process by deriving the temperature range in which the recovery rate is maintained high in the first membrane process and the temperature range in which the separation efficiency (selectivity) is maintained high in the second membrane process.

Further, since the devised membrane separation method has an effect of adjusting the amount of gas to be cooled, there is a merit in that the cooling energy is remarkably reduced while a high recovery rate and high purity are maintained compared to a conventional low-temperature membrane separation process. In other words, in the first membrane process, the cooling step may be omitted or may be performed at a temperature not very low, and, in the second membrane process, the cooling step may be performed at a relatively low temperature for the amount of gas adjusted through the first membrane process. Accordingly, the cooling energy used in the overall process can be reduced. When the cooling step is omitted or weakly performed in the first membrane process as described above, the recovery rate (permeance) of the gas is not reduced but the cooling energy is reduced. Meanwhile, only a part of the gas initially provided after passing through the first membrane may be cooled in the second membrane process. Accordingly, cooling energy may be reduced more than in the case where all of the feed gas is cooled, and separation efficiency may be improved through an appropriate level of cooling.

Purity and Recovery Rate of $CO_2$ in Low-Temperature Membrane Separation Process In order to confirm the performance of the low-temperature membrane separation process, comparative experiments on the purity and the recovery rate of carbon dioxide were performed in the cases in which the low-temperature process was applied to a single membrane including a polyimide material and in which the low-temperature process was not applied to the single membrane. The results are shown in Table 1.

In Table 1, in Experimental Example 1, while the membrane-cooling device was operated to thus perform cooling until the temperature of the membrane unit reached $-40°$ C., the mixed gas was provided in order to perform the process for separating carbon dioxide twice. The temperature was measured using a temperature sensor positioned 45 cm above the bottom surface in the cooling device having an internal volume of 55×40×50 cm (width×depth×height), and the membrane unit was positioned 15 cm above the bottom surface.

Gas mixture of $CO_2$ and $N_2$ mixed at a ratio of 14:86 was used as the feed gas, the flow rate of the feed gas at the time of feed was 0.2 $Nm^3/h$, the pressure of the feed gas line was 2.0 bar, and the pressure of the permeate gas line was 0.2 bar. All of the pressures referred to herein refer to absolute pressure, and are all the same below.

In Experimental Example 2, while both the membrane-cooling device and the feed-gas-cooling device were operated to thus perform cooling until both the temperature of the membrane unit and the temperature of the feed gas reached $-40°$ C., the process for separating carbon dioxide was performed twice.

Gas mixture of $CO_2$ and $N_2$ mixed at a ratio of 14:86 was used as the feed gas, the flow rate of the feed gas was 0.2 $Nm^3/h$, the pressure of the feed gas line was 2.0 bar, and the pressure of the permeate gas line was 0.2 bar.

In addition, in a Comparative Experimental Example, a membrane device including a feed gas line, a permeate gas line, and a retentate gas line connected to a membrane unit therein was used to separate carbon dioxide. To this end, a conventional membrane device including no membrane-cooling device may be used, or a process for separating carbon dioxide may be performed without operating a membrane-cooling device or an feed-gas-cooling device in the membrane device of the present invention.

A gas mixture of $CO_2$ and $N_2$ mixed at a ratio of 14:86 was used as the feed gas, the flow rate of the feed gas was 0.4 $Nm^3/h$, the pressure of the feed gas line was 2.0 bar, and the pressure of the permeate gas line was 0.2 bar.

The results of carbon dioxide separation according to Experimental Examples 1 and 2 and Comparative Experimental Example 1 are as follows.

TABLE 1

| Condition | $CO_2$ purity (%) | $CO_2$ recovery rate (%) |
| --- | --- | --- |
| Experimental Example 1 | 80.3 | 26.9 |
|  | 80.4 | 27.1 |
| Experimental Example 2 | 77.4 | 16.9 |
|  | 78.6 | 20.9 |
| Comparative Experimental Example | 55.7 | 51.0 |

In the case of Comparative Experimental Example, a large amount of carbon dioxide was recovered, but the purity was only 55.7%, which shows that the selectivity for separating only carbon dioxide is very poor.

On the other hand, in Experimental Example 1 and Experimental Example 2, although the recovery rate was relatively low, it was confirmed that the purity of carbon dioxide was greatly increased. In particular, in the case of Experimental Example 1, the purity was excellent, i.e., 80% or higher. The lower recovery in Experimental Example 2 is considered to result from lowered gas mobility due to cooling of the feed gas to a low temperature.

Permeance and Selectivity for Carbon Dioxide and Nitrogen Gases Depending on Temperature FIG. 2 shows the results of measurement of the permeance of a single gas of carbon dioxide and a single gas of nitrogen, depending on the temperature of the membrane unit. From FIG. 2, the relationship of the permeance and selectivity for carbon dioxide and nitrogen gases according to the temperature change can be confirmed. For example, FIG. 2B shows the case where a polyimide-based polymer hollow-fiber membrane module was used as the membrane unit, a feed gas line pressure was set to 2.0 bar, a permeate gas line pressure was set to 0.2 bar, and the flow rate of each of single component gases of $CO_2$ and $N_2$ passing through the membrane of the permeate side in the membrane module was measured.

As shown in the drawings, the permeance of carbon dioxide is higher than the permeance of nitrogen in the temperature range in which the separation process is capable of being performed, and the permeance of carbon dioxide tends to be almost constant or increased but the permeance of nitrogen is greatly reduced as the temperature is decreased. That is, it can be seen that the lower the temperature, the larger the difference in permeance of carbon dioxide and nitrogen. Therefore, it can be understood that when the membrane separation process is performed at a relatively low temperature in order to separate the mixed gas containing a large amount of nitrogen together with carbon dioxide, the carbon dioxide selectivity for the mixed gas is improved due to the difference in permeance of carbon dioxide and nitrogen.

Figure 4:
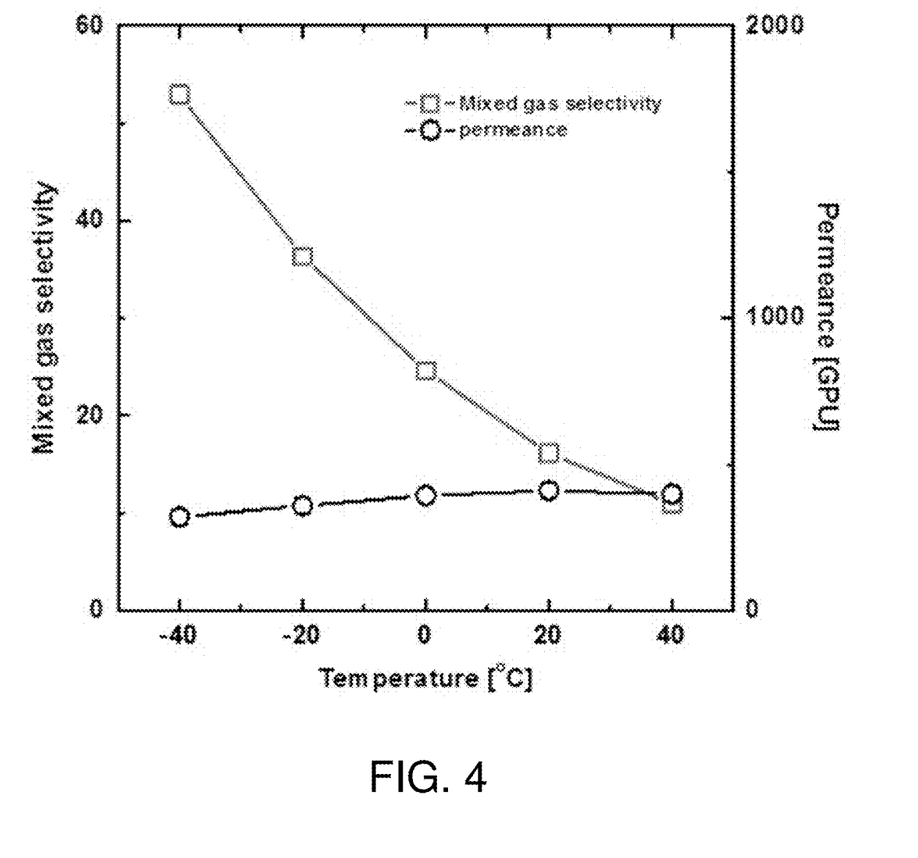
FIG. 4 is a graph showing the results of the permeance and mixed gas selectivity of the mixed gas of carbon dioxide and nitrogen depending on the temperature of the membrane unit.

FIG. 4 shows the results of measurement of the permeance of the mixed gas of carbon dioxide and nitrogen and the mixed gas selectivity depending on the temperature of the membrane unit.

As seen in FIG. 2, as the temperature at which the separation process is performed is decreased, carbon dioxide selectivity to the mixed gas is relatively increased and carbon dioxide having very high purity is obtained.

These results show that, in the case of the polymer membrane in which the diffusivity is reduced as the temperature is decreased according to the Arrhenius equation, a reduction in permeance caused by the lowering of the diffusivity is more strongly exhibited in nitrogen as the temperature of the membrane is decreased.

Measurement of Purity of $CO_2$ Depending on Temperature of First Membrane Unit and Second Membrane Unit Hereinafter, the performance of the method for separating carbon dioxide using the Examples of the present invention will be described.

First, the membrane-cooling device 300 included in the low-temperature membrane separation device for capturing carbon dioxide at the high concentration shown in FIG. 1 was operated to change the temperature T3 of the second membrane unit 100 and sequentially pass the mixed gas through the first membrane unit 100 and the second membrane unit 200, thus separating carbon dioxide. For the sake of comparison, the same cooling device was provided in the first membrane unit 100, and the temperature T1 of the first membrane unit 100 was also changed.

The pressure at the feed side of the first membrane unit is 2.0 bar (absolute pressure), the pressure discharged to the permeate gas line is 0.2 bar (absolute pressure), the pressure at the feed side of the second membrane unit is 2.0 bar (absolute pressure), and the pressure discharged to the permeate gas line is 0.1 bar (absolute pressure). The target gas to be treated is gas mixture containing 14% of carbon dioxide, and the flow rate thereof is 0.3 $Nm^3/h$. Polyimide-based polymer membrane modules were used for the materials of the first and second membrane units, and the membrane area ratio of the first membrane unit and the second membrane unit was made constant.

When T1 was 30° C., 20° C., 0° C., −20° C., and −40° C., carbon dioxide was separated while T3 was reduced to 20° C., 0° C., −10° C., −20° C., and −40° C., respectively. The concentration of carbon dioxide, the purity improvement rate (%) of carbon dioxide, and the recovery rate (%) of $CO_2$ finally obtained for each Example are shown in Tables 2 to 7.

Figure 5:
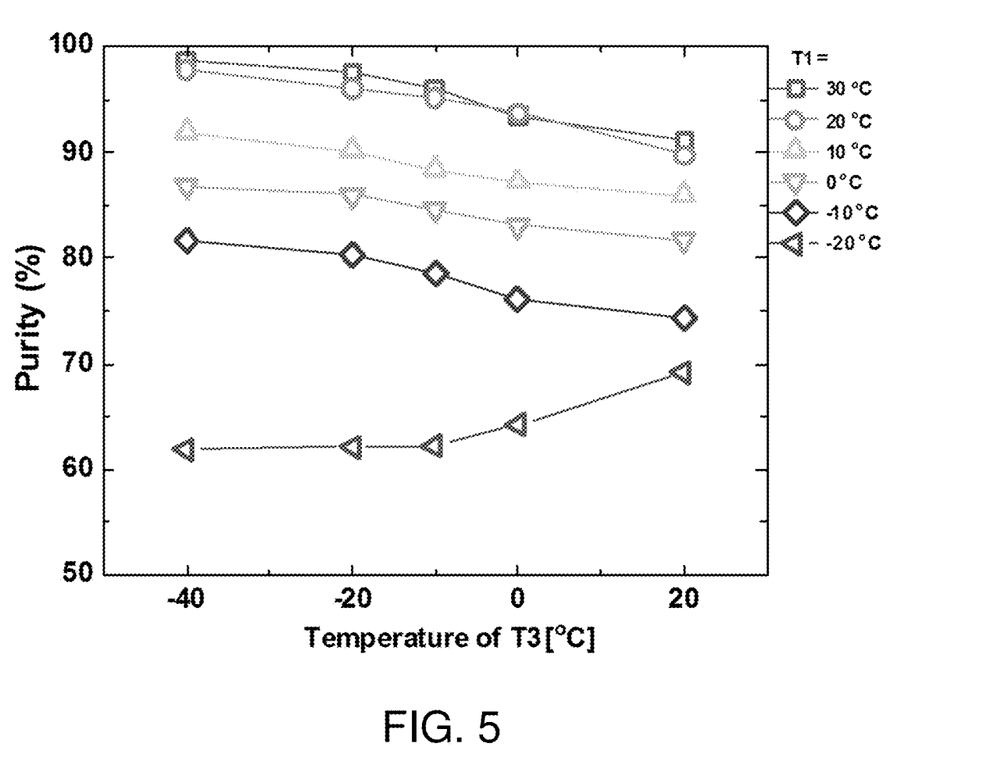
FIG. 5 is a graph showing the result of measurement of the purity of carbon dioxide according to a change in temperature T3 of a second membrane unit with respect to each temperature T1 of a first membrane unit.

FIG. 5 is a graph showing the result of measurement of the purity of carbon dioxide depending on the temperature of a second membrane unit based on the data of Tables 2 to 7.

TABLE 2

| | T1 (° C.) | T3 (° C.) | Concentration of carbon dioxide (%) | Purity improvement rate (%) | Recovery rate of $CO_2$ (%) |
|---|---|---|---|---|---|
| Example 2-1 | 30 | 20 | 91.1 | — | 90.7 |
| Example 2-2 | 30 | 0 | 93.5 | 2.7 | 88.0 |
| Example 2-3 | 30 | −10 | 95.9 | 5.4 | 84.7 |
| Example 2-4 | 30 | −20 | 97.6 | 7.2 | 83.8 |
| Example 2-5 | 30 | −40 | 98.6 | 8.3 | 82.0 |

TABLE 3

| | T1 (° C.) | T3 (° C.) | Concentration of carbon dioxide (%) | Purity improvement rate (%) | Recovery rate of $CO_2$ (%) |
|---|---|---|---|---|---|
| Comparative Example 3-1 | 20 | 20 | 89.8 | — | 81.7 |
| Example 3-1 | 20 | 0 | 93.8 | 4.4 | 80.6 |
| Example 3-2 | 20 | −10 | 95.1 | 6.0 | 77.6 |
| Example 3-3 | 20 | −20 | 96.0 | 7.0 | 74.0 |
| Example 3-4 | 20 | −40 | 97.8 | 8.9 | 70.4 |

TABLE 4

| | T1 (° C.) | T3 (° C.) | Concentration of carbon dioxide (%) | Purity improvement rate (%) | Recovery rate of $CO_2$ (%) |
|---|---|---|---|---|---|
| Comparative Example 4-1 | 10 | 20 | 85.9 | — | 67.5 |
| Example 4-1 | 10 | 0 | 87.2 | 1.5 | 50.8 |
| Example 4-2 | 10 | −10 | 88.4 | 2.9 | 58.0 |
| Example 4-3 | 10 | −20 | 90.1 | 4.9 | 53.1 |
| Example 4-4 | 10 | −40 | 91.9 | 6.9 | 50.4 |

TABLE 5

| | T1 (° C.) | T3 (° C.) | Concentration of carbon dioxide (%) | Purity improvement rate (%) | Recovery rate of CO$_2$ (%) |
|---|---|---|---|---|---|
| Comparative Example 5-1 | 0 | 20 | 81.6 | — | 46.3 |
| Comparative Example 5-2 | 0 | 0 | 83.1 | 1.8 | 40.5 |
| Example 5-1 | 0 | −10 | 84.5 | 3.6 | 37.1 |
| Example 5-2 | 0 | −20 | 86.0 | 5.3 | 33.9 |
| Example 5-3 | 0 | −40 | 86.8 | 6.3 | 30.9 |

TABLE 6

| | T1 (° C.) | T3 (° C.) | Concentration of carbon dioxide (%) | Purity improvement rate (%) | Recovery rate of CO$_2$ (%) |
|---|---|---|---|---|---|
| Comparative Example 6-1 | −20 | 20 | 74.3 | — | 44.3 |
| Comparative Example 6-2 | −20 | 0 | 76.1 | 2.5 | 43.2 |
| Comparative Example 6-3 | −20 | −10 | 78.5 | 5.7 | 38.3 |
| Comparative Example 6-4 | −20 | −20 | 80.4 | 8.2 | 36.1 |
| Example 6-1 | −20 | −40 | 81.6 | 10.0 | 27.4 |

TABLE 7

| | T1 (° C.) | T3 (° C.) | Concentration of carbon dioxide (%) | Purity improvement rate (%) | Recovery rate of CO$_2$ (%) |
|---|---|---|---|---|---|
| Comparative Example 7-1 | −40 | 20 | 69.2 | — | 44.5 |
| Comparative Example 7-2 | −40 | 0 | 64.2 | −7.2 | 39.3 |
| Comparative Example 7-3 | −40 | −10 | 62.2 | −10.1 | 35.3 |
| Comparative Example 7-4 | −40 | −20 | 62.1 | −10.2 | 30.3 |
| Comparative Example 7-5 | −40 | −40 | 61.9 | −10.5 | 27.1 |

The data of the Comparative Examples and the Examples described in Tables 2 to 7 show changes in the concentration and recovery rate of carbon dioxide in the membrane process obtained by adjusting the temperature T1 of the first membrane unit and the temperature T3 of the second membrane unit. First, in Example 2-1, when the temperature of the first membrane unit is 30° C. and the temperature of the second membrane unit is 20° C., the purity and recovery rate are high, namely 91.05% and 90.66% respectively, indicating that the CO$_2$ capture efficiency is high. Meanwhile, when the temperature of the second membrane unit is reduced to −40° C. as in Example 2-5, the recovery rate is slightly reduced, but the purity of carbon dioxide is improved to 98.58%. In consideration of the fact that liquefaction becomes easy in the subsequent liquefaction process as the purity of the captured carbon dioxide is increased, the process for capturing carbon dioxide with a higher purity by further reducing the temperature of the second membrane unit may be technically meaningful.

Further, according to Tables 2 to 5 and FIG. 5, under the condition in which the temperature of the first membrane unit was 0 to 30° C., the purity was 80% or more regardless of the temperature of the second membrane unit, and under the condition in which the temperature of the first membrane unit was 10° C. or higher, the purity was 85% or more regardless of the temperature of the second membrane unit.

Further, in terms of the recovery rate of CO$_2$, the recovery rate of CO$_2$ was measured to be 30% or more in the case of the Examples, in which the temperature of the first membrane unit was 0° C. or more, and the recovery rate of the CO$_2$ was high, namely 50% or more when the temperature of the first membrane unit was 10° C. or more. This is considered to be due to the fact that, when the temperature of the first membrane unit is relatively high, the mixed gas passes through the first membrane unit at a high recovery rate and the permeation gas of the first membrane unit passing therethrough at a high recovery rate is provided as the feed gas of the second membrane unit, so that the condition in which the high recovery rate is obtained in the first membrane unit results in a high total CO$_2$ recovery rate.

As described above, when the temperature of the first membrane unit was not reduced or was 0° C. or more regardless of the temperature of the second membrane unit, it was confirmed that the overall result was good in terms of purity and recovery rate. Further, when the temperature of the second membrane unit is a relatively low temperature under the above-described temperature condition of the first membrane unit, the purity of carbon dioxide may be further increased.

Therefore, the temperature of the first membrane unit and the temperature of the second membrane unit may be suitably adjusted in consideration of other operating parameters such as the CO$_2$ composition in the mixed gas to be fed and the area of the membrane, as well as the desired purity and recovery rate of carbon dioxide and required cooling energy resources, whereby the efficiency of the membrane separation process may be improved.

Meanwhile, regardless of whether or not the first membrane unit is cooled, in the case where the low-temperature membrane process using cooling is performed in the second membrane unit, the cooling energy may be reduced. In Comparative Examples 7-1 to 7-5 of Table 7, all of 0.3 Nm$^3$/h corresponding to the total flow rate of the feed gas needs to be cooled to −40° C., whereas in Example 2-5 of Table 2, only 0.14 Nm$^3$/h provided into the second membrane unit may be cooled to −40° C. Further, in the case of Example 2-5, the purity and the recovery rate of carbon dioxide that is captured are higher than the purity and the recovery rate of carbon dioxide of Comparative Examples 7-1 to 7-5. Therefore, it can be understood that when a relatively low-temperature process is applied to the second separation step rather than the first separation step, carbon dioxide is captured with a high purity and a recovery rate, and the cooling energy required for CO$_2$ capture is reduced.

In the above-described Examples and Comparative Examples, the flow rate of the gas supplied to the feed side of the first membrane unit was 0.3 Nm$^3$/h, and only the permeation gas passing through the first membrane unit was supplied to the feed side of the second membrane unit. Accordingly, the flow rate in the feed side of the second membrane unit was much smaller than 0.3 Nm$^3$/h, which was the flow rate of the initially supplied gas. The flow rate of the gas provided into the second membrane unit after passing through the first membrane unit may be adjusted depending on the pressure in the feed side and the permeate side of the first membrane unit and the area of the first membrane unit. The flow rate is typically 10% to 50% of the flow rate of the gas in the feed side of the first membrane unit, and the ratio of carbon dioxide of the gas provided into the second membrane unit is higher than that of carbon dioxide in the gas in the feed side of the first membrane unit.

The present invention adopts the characteristic of increasing the purity of carbon dioxide using low-temperature separation, characterized in that the separation process in the second membrane unit having a relatively higher ratio of carbon dioxide is performed at a temperature that is lower than the temperature at which the separation process in the first membrane unit is performed. The present invention has been made in view of the fact that the separation efficiency is improved much more when the low-temperature membrane separation process is applied to the feed gas having a higher ratio of carbon dioxide. The amount of the gas to be cooled at the second membrane unit could be reduced because the amount of the feed gas at second membrane unit corresponds to the amount of the permeate gas of the first membrane unit. Therefore, the amount of gas subject to low temperature process which requires relatively greater cooling energy, is reduced.

When the cooling step is omitted or weakly performed in the first membrane process as described above, the recovery rate (permeance) of the gas is not reduced, but the cooling energy is reduced. Meanwhile, only a part of the gas initially provided after passing through the first membrane may be cooled in the second membrane process. Accordingly, cooling energy may be reduced more than in the case where all of the feed gas is cooled, and separation efficiency may be improved through an appropriate level of cooling. Further, in the present invention, cooling energy is capable of being greatly reduced while maintaining a high recovery rate and purity compared to a conventional low-temperature membrane separation process that has been applied to a single membrane or a method of performing a low-temperature process by cooling a plurality of membranes to the same level.

In other words, the cooling step may be omitted or weakly performed in the first membrane process, and a relatively high level of cooling may be performed for the amount of gas adjusted through the first membrane process in the second membrane process, thereby increasing the purity of carbon dioxide captured in the whole process. In addition, the cooling energy added to the whole process may be reduced by performing the cooling in steps.

Further, in order to confirm the separation performance of carbon dioxide as the temperature of T1 changes with respect to each temperature when T3 is 20° C., 0° C., −10° C., −20° C., and −40° C., Tables 8 to 12 were constructed by rearranging Tables 2 to 7, and the results are shown below.

TABLE 8

| T1 (° C.) | T3 (° C.) | Concentration of carbon dioxide (%) |
|---|---|---|
| 30 | 20 | 91.1 |
| 20 | 20 | 89.8 |
| 10 | 20 | 85.9 |
| 0 | 20 | 81.6 |
| −20 | 20 | 74.3 |
| −40 | 20 | 69.2 |

TABLE 9

| T1 (° C.) | T3 (° C.) | Concentration of carbon dioxide (%) |
|---|---|---|
| 30 | 0 | 93.5 |
| 20 | 0 | 93.8 |
| 10 | 0 | 87.2 |
| 0 | 0 | 83.1 |

TABLE 9-continued

| T1 (° C.) | T3 (° C.) | Concentration of carbon dioxide (%) |
|---|---|---|
| −20 | 0 | 76.1 |
| −40 | 0 | 64.2 |

TABLE 10

| T1 (° C.) | T3 (° C.) | Concentration of carbon dioxide (%) |
|---|---|---|
| 30 | −10 | 95.9 |
| 20 | −10 | 95.1 |
| 10 | −10 | 88.4 |
| 0 | −10 | 84.5 |
| −20 | −10 | 78.5 |
| −40 | −10 | 62.2 |

TABLE 11

| T1 (° C.) | T3 (° C.) | Concentration of carbon dioxide (%) |
|---|---|---|
| 30 | −20 | 97.6 |
| 20 | −20 | 96.0 |
| 10 | −20 | 90.1 |
| 0 | −20 | 86.0 |
| −20 | −20 | 80.4 |
| −40 | −20 | 62.1 |

TABLE 12

| T1 (° C.) | T3 (° C.) | Concentration of carbon dioxide (%) |
|---|---|---|
| 30 | −40 | 98.6 |
| 20 | −40 | 97.8 |
| 10 | −40 | 91.9 |
| 0 | −40 | 86.8 |
| −20 | −40 | 81.6 |
| −40 | −40 | 61.9 |

In the case where T3 is constant, it can be seen that the purity of carbon dioxide is rather remarkably reduced when the temperature of T1 is reduced from 30° C. to −40° C. This supports the point that the relatively higher purity of carbon dioxide is capable of being obtained by relatively more reducing the temperature of T3 than by reducing the temperature of T1 in the present invention.

Example of Two-Stage Low-Temperature Membrane Separation Process

Figure 6A:
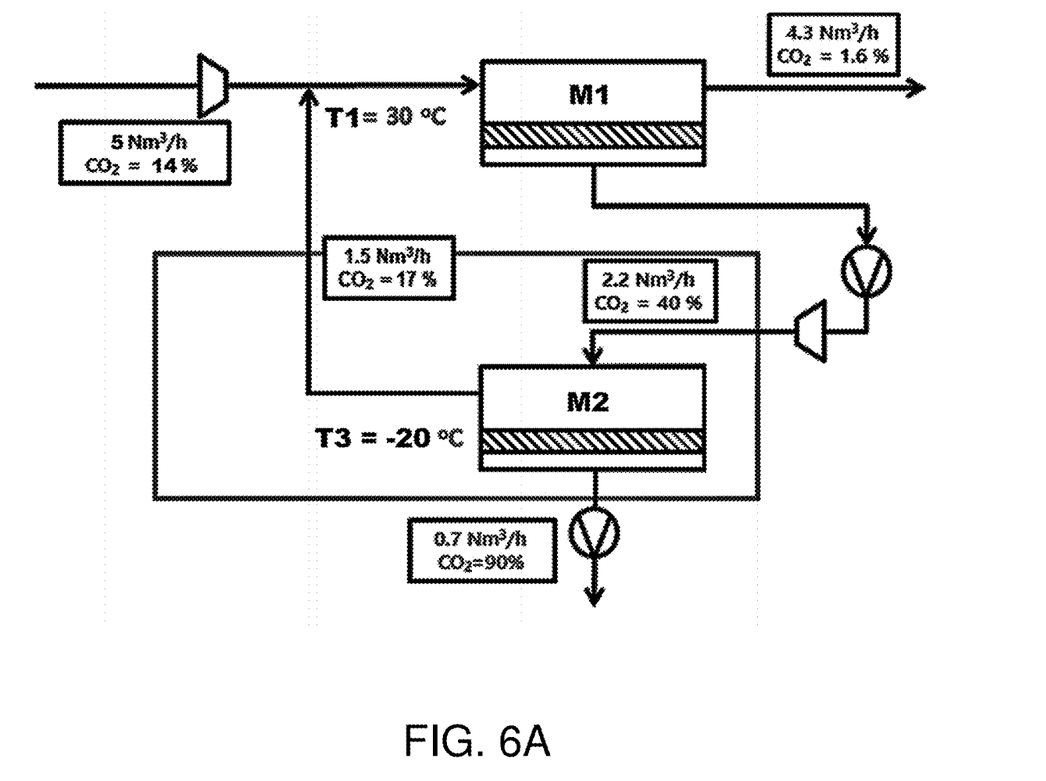
FIGS. 6A and 6B are views showing specific embodiments in the case where low-temperature separation is applied in a two-stage membrane process according to the present invention.
Figure 6B:
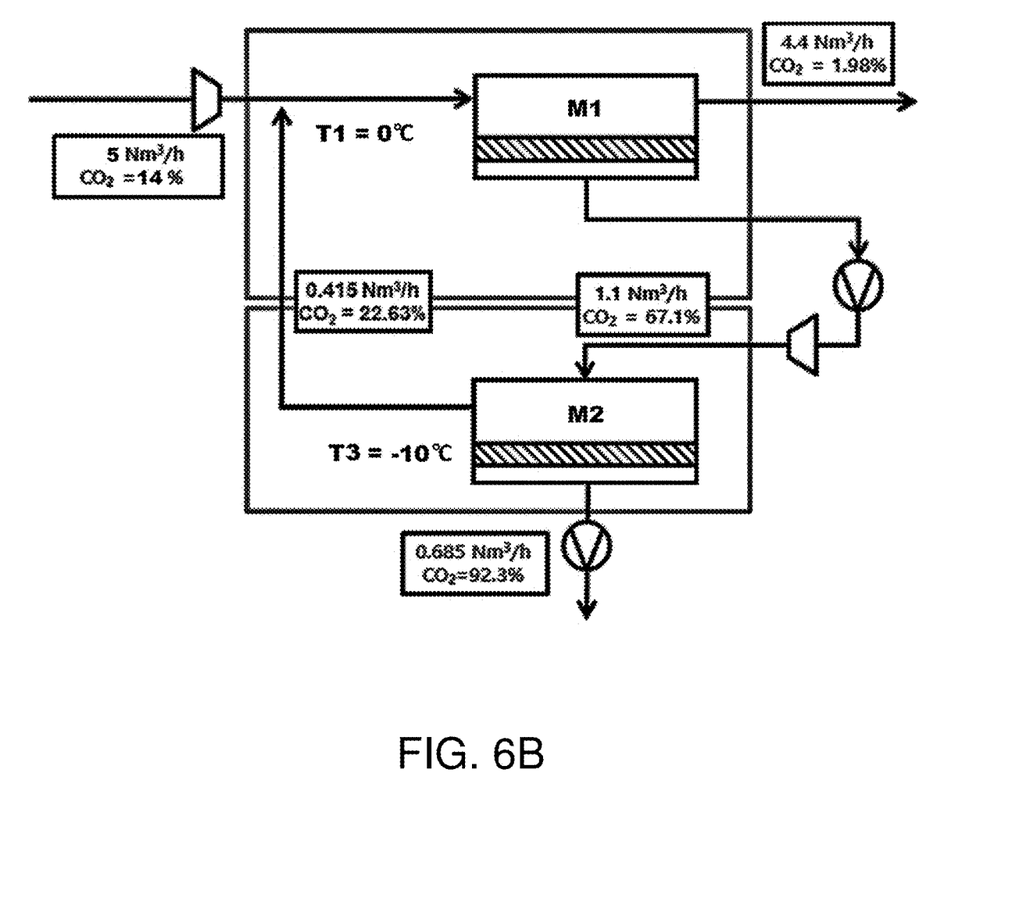

FIG. 6 shows specific embodiments in the case where low-temperature separation is applied in a two-stage membrane process according to the present invention.

Example 7-1 shown in FIG. 6A is different from the Examples described above, and shows a process in which membrane separation is performed while the temperature T1 of the first membrane unit M1 is maintained at 30° C. and the temperature T3 of the second membrane unit M2 is maintained at −20° C., and the residual gas of the second membrane unit is not discharged but is recovered to the feed side of the first membrane unit. The flow rate of the gas and the purity of carbon dioxide measured in the first permeate gas line (second feed gas line), the first retentate gas line, the second retentate gas line, and the second permeate gas line in the case when injection was performed so that the flow rate of the initially provided gas was 5 Nm³/h to thus perform separation are shown in the drawing. The pressure at the feed side of the first membrane unit was 2.0 bar (absolute pressure), the pressure discharged to the permeate gas line was 0.1 bar (absolute pressure), the pressure at the feed side of the second membrane unit was 2.0 bar (absolute pressure), and the pressure discharged to the permeate gas line was 0.05 bar (absolute pressure). Further, the target gas to be treated is gas mixture containing 14% of carbon dioxide. From FIG. 6A, it can be confirmed that the total amount of the feed gas is 5 Nm$^3$/h but the amount of the gas to be cooled to −20° C. in the second membrane unit is reduced to 2.2 Nm$^3$/h. Further, the final amount of the gas that permeated the second membrane unit and was then captured was 0.7 Nm$^3$/h, and the concentration of carbon dioxide in the gas was 90%. The calculated recovery rate of $CO_2$ is 90%, which is higher than the recovery rate in the one-stage low-temperature membrane process (Experimental Examples 1 and 2). Accordingly, it can be confirmed that the high-purity carbon dioxide is capable of being collected at a relatively high recovery rate in the low-temperature process of the two-stage membrane according to the present invention.

Further, Example 7-2 shown in FIG. 6B shows the flow rate of the gas and the purity of carbon dioxide measured in the first permeate gas line (second feed gas line), the first retentate gas line, the second retentate gas line, and the second permeate gas line in the cases when membrane separation is performed while the temperature T1 of the first membrane unit M1 is maintained at 0° C. and the temperature T3 of the second membrane unit M2 is maintained at −10° C. and when feed side ion is performed so that the flow rate of the feed gas is 5 Nm$^3$/h to thus perform separation. The pressure at the feed side of the first membrane unit was 1.7 bar (absolute pressure), the pressure discharged to the permeate gas line was 0.01 bar (absolute pressure), the pressure at the feed side of the second membrane unit was 3.2 bar (absolute pressure), and the pressure discharged to the permeate gas line was 0.1 bar (absolute pressure). Further, the target gas to be treated is gas mixture containing 14% of carbon dioxide. FIG. 6B shows the case in which 5 Nm$^3$/h of the total amount of the feed gas was not cooled through one stage but the gas was cooled to 0° C. in the first membrane unit through one stage and then only 1.1 Nm$^3$/h of the gas permeating the first membrane unit M1 was cooled to −10° C. in the second membrane unit so that the cooling was performed in stages, thus performing separation. The stepwise cooling allows cooling energy to be reduced more compared to the cooling of 5 Nm$^3$/h of the total amount of the gas to sub-zero temperatures. Further, the amount of gas collected after permeating the second membrane unit was 0.685 Nm$^3$/h, the concentration of carbon dioxide in the gas was 92.3%, and the recovery rate was calculated to be 90.3%. Although the cooling level of the second membrane unit was not high compared to Example 7-1 of FIG. 6A, it can be confirmed that high purity and a high recovery rate of $CO_2$ were achieved through stepwise cooling.

The low-temperature membrane device and method of the present invention may be applied alone to the separation of carbon dioxide, but the device and method are generally applied as a part of a carbon dioxide separation system or separation process. The carbon dioxide separation system or separation process may further include pre-treating an exhaust gas or a biogas and concentrating carbon dioxide, and there is no restriction on addition of constitutions related to the device or the process for separating carbon dioxide within the range not exceeding the characteristics of the present invention.

While the present invention has been particularly shown and described with reference to preferred embodiments thereof, it will be understood by those skilled in the art that the above-described embodiments are merely illustrative of the technical idea of the present invention, and are intended to cover various modifications without departing from the technical idea of the present invention. Therefore, the scope of protection of the present invention should be construed not by the specific embodiments but by the matters described in the claims, and all technical ideas within the scope equivalent thereto shall be construed as being included in the scope of the present invention.

What is claimed is:

1. A membrane separation method for capturing carbon dioxide, in which a gas mixture is passed through a membrane unit to selectively separate the carbon dioxide, the membrane unit having a feed side, into which a carbon-dioxide-containing gas is provided, a retentate side, from which a carbon-dioxide-depleted stream is discharged, and a permeate side, from which a carbon-dioxide-enriched stream is produced, the membrane separation method comprising:
    a first separation step of passing the gas mixture through a first membrane unit, which is connected at a feed side thereof to a first feed gas line;
    a second separation step of passing the carbon-dioxide-enriched stream, withdrawn from the permeate side of the first membrane unit, through a second membrane unit, which is connected at a feed side thereof to a second feed gas line; and
    a step of cooling a feed gas of the second membrane unit through a feed-gas-cooling device, between the first separation step and the second separation step,
    wherein the second separation step is performed at a temperature that is lower than a temperature at which the first separation step is performed,
    wherein the temperature at which the first separation step is performed is determined by adjusting at least one of a temperature of the first membrane unit and a temperature of the gas mixture provided into the first membrane unit, and the temperature at which the second separation step is performed is determined by adjusting at least one of a temperature of the second membrane unit and a temperature of the gas which permeates the first membrane unit and is then provided into the second membrane unit,
    wherein the feed-gas-cooling device includes a coil unit which is extended to the second feed gas line.

2. The membrane separation method of claim 1, wherein a selectivity of the carbon dioxide in the second membrane unit is higher than a selectivity of the carbon dioxide in the first membrane unit.

3. The membrane separation method of claim 1, wherein the second separation step is performed at a temperature in a range of −40° C. to 0° C.

4. The membrane separation method of claim 3, wherein the second separation step is performed at a temperature in a range of −40° C. or more and less than −10° C.

5. The membrane separation method of claim 4, wherein the second separation step is performed at a temperature in a range of −40° C. to −20° C.

6. The membrane separation method of claim 1, wherein the first separation step is performed at a temperature in a range of −20° C. to 30° C.

7. The membrane separation method of claim 6, wherein the first separation step is performed at a temperature in a range of 0° C. to 30° C.

8. The membrane separation method of claim 1, wherein activation energy of carbon dioxide permeation is smaller than activation energy of nitrogen permeation in the second membrane unit.

9. The membrane separation method of claim 8, wherein, in the membrane of the second membrane unit, a difference between the permeance of carbon dioxide and the permeance of nitrogen is increased as a temperature is decreased.

* * * * *